United States Patent Office 2,957,846
Patented Oct. 25, 1960

2,957,846

POLYTHIOUREA AND PHENOLIC-ALDEHYDE CO-CURED RESINS

George L. Wesp, Dayton, Ohio, assignor to Monsanto Chemical Company, St. Louis, Mo., a corporation of Delaware No Drawing. Filed Dec. 31, 1958, Ser. No. 784,018

6 Claims. (Cl. 260—43)

The invention relates to synthetic resins formed by co-curing mixtures of linear polythiourea polymers and phenolicaldehyde polymer.

Polythiourea high polymers have long been known. They are conveniently prepared by a number of methods, perhaps the simplest being the reaction of a diamine with carbon disulfide; a condensation polymerization is effected wherein hydrogen sulfide is eliminated and the resulting high polymer is called a polythiourea. Various other procedures are available for making polythioureas such as by reaction of a trithiocarbonic acid and a polyamine, reaction of a polyamine with a bis (dithiocarbamate), reaction of a diamine with ammonium thiocyanate, and reaction of a polyamine with a polyisothiocyanate. See U.S. Patent 2,313,871 for further details. The type of diamines and resulting recurring unit in a polythiourea is subject to almost infinite variation. Most polythiourea polymers are of comparatively high melting point, e.g., above 50 or 100° C., and usually above 150° C. The properties of a polythiourea are dependent on the initial reactants and on the extent of polymerization. The most favored type of diamine reactant is the alkylene diamine, e.g., other diamines having straight-chain, branched-chain or cyclic structure, and consisting of carbon and hydrogen or also including hetero-atoms, have also been mentioned as reactants for use in making polythioureas. Principal interest, however, has been in those reactants and reaction condition which give high melting point fiber-forming polymers. In my copending application Serial No. 422,256, filed April 9, 1954, now U.S. 2,884,401, there is described a rubbery polythiourea having extraordinary solvent resistance and further having good response to reinforcement by carbon black.

The phenolic-aldehyde polymers have been known even longer than the polythiourea polymers. The earliest work on the so-called phenolics or phenoplasts dates back to the latter part of the 19th century with a number of patents issuing between 1899 and 1905. However, nothing of commercial importance was developed until 1905 and after when Leo H. Baekeland began working in this field. These resins are formed by reacting a phenolic compound which can be mono- or polyhydroxy and mono- or polycyclic aromatic with an aldehyde usually formaldehyde in the presence of an acidic or basic catalyst. The base-catalyzed phenolic-aldehyde resins have been classified into three types based on physical properties. These types are the A-, B-, and the C-stage resins, also known as resole, resitole and resite, respectively. The A-stage resin may be a liquid, solid or semi-solid and it is readily soluble in ketones such as acetones, methyl ethyl ketones, etc. Also the A-type is converted to the B-type by further heating. The B-stage resin is usually solid and is insoluble in acetone although swelled thereby, and it can be softened by heat a limited number of times before it converts to the C-stage or fully cured plastic. The C-type is completely insoluble in acetone and infusable. The acid-catalyzed resins are called novolacs, and unlike the base-catalyzed resins, the novolacs are linear polymers. It is necessary to add a cross-linking agent to the novolac to obtain a fully cured resin; whereas, the base-catalyzed resins require no added cross-linking agent, although cross-linking or curing agent can be added, if desired. The novolac resin can be cured under alkaline conditions with more formaldehyde. This invention involves only the A and B stage type resins, i.e. the resole and resitole, and the novolacs. A thorough discussion of phenolic plastics is found in the text "The Chemistry of Commercial Plastics" by Wakeman (1947), chapter 6, beginning on page 113.

It is an object of this invention to provide a new and useful type of resin.

It is another object of this invention to provide new and useful adhesives for aluminum.

These and other objects of the invention will become apparent as the detailed description of the invention proceeds.

It has now been found that mixtures of linear polythiourea polymers and resole, resitole or novolac phenolicaldehyde polymers can be co-cured by heating at elevated temperatures to produce a new and useful type of synthetic resin.

Polythioureas in general are usable in making the resins of the invention. Suitable polythioureas are described in U.S. 2,313,871 and other suitable polythioureas are described in my copending application Serial No. 422,256, filed April 9, 1954. However, the preferred polythioureas for use in the invention can be represented by the following type formula in which the "chain" has at least 2 carbon atoms:

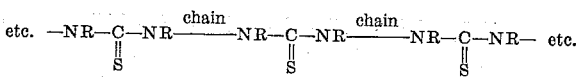

In the foregoing formula R preferably represents hydrogen or less preferably a monovalent hydrocarbon radical, especially alkyl. The "chain" can include one or more hetero-atoms such as oxygen, sulfur or nitrogen, the preferred one being oxygen. Where a plurality of hetero-atoms is present, they should be separated from each other by at least one and preferably two or more carbon atoms. Particularly suitable polythioureas are those containing a "chain" of from 2 to about 13 atoms, preferably at least about 7 atoms, between nitrogen atoms of adjacent thiourea residues, the terminal members of such chains being carbon atoms.

Those skilled in the art, having the benefit of the present disclosure will understand various types of reactants and reaction procedure available for making polythioureas having the limitations herein described. As a matter of convenience and referring to the preferred class of reactants the discussion given hereafter will be principally concerned with the reaction of a diamine with carbon disulfide; however, the various other types of reactants known to give polythioureas, for example, as described in the aforementioned U.S. Patent 2,313,871 and elsewhere in the art, can also be used with suitable modifications which will be understood by those skilled in the art.

The preparation of a polythiourea from carbon disulfide and a diamine, generally involves reacting carbon disulfide with a diamine having the formula

NHR—X—NRH wherein R is hydrogen or a monovalent hydrocarbon radical, preferably hydrogen, or if a hydrocarbon radical, preferably a lower alkyl group, and where the R's can be the same or different in the diamine, and wherein X comprises a chain of at least 2 carbon atoms and preferably not more than about 13 atoms including one or more hetero-atoms selected from the group consisting of oxygen, sulfur and nitrogen. In theory equimolar quantity of carbon disulfide and diamine reactants can be used, but it is preferred to charge an excess of carbon disulfide over the theoretical quantity required in order to obtain more efficient reaction; unreacted carbon disulfide is later removed as by evaporation from the polymeric material. The reaction is conveniently effected in a solvent, e.g. methanol, phenol, water, benzene, etc. After initial reaction of carbon disulfide with diamine the resulting material is heated to a temperature which can suitably be within the range of 100 to 200° C. until the condensation polymerization has continued to the desired extent. The reaction liberates hydrogen sulfide which is preferably continuously removed. The reaction period will ordinarily be at least 1 hour and frequently will be within the range of 2 to 6 hours. To a certain extent the reaction time is inversely proportional to the temperature. It is often convenient to carry out the reaction at 2 or more different temperature levels first using a comparatively low temperature and later increasing temperature to obtain the final stages of polymerization.

By way of example and not limitation of suitable primary and secondary diamines useful in preparing polythioureas as to be used in the practice of the invention can be mentioned:

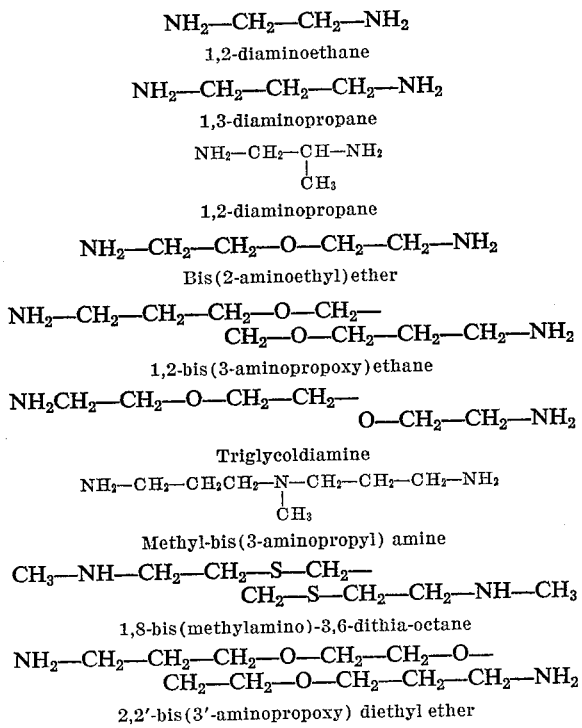

It will be seen that all of the foregoing compounds meet the requirement as stated herein. Of course, those skilled in the art will understand that the diamine should not contain the groups which under the conditions employed for the formation of the polythiourea polymer are reactive with the diamines themselves or the carbon disulfide. Also those skilled in the art will understand that when the polythioureas are to be prepared from a diamine and a reactant other than carbon disulfide, e.g., a bis(dithiocarbamate) or a diisothiocyanate, the other reactant should conform to the requirements stated herein. It will be apparent that where a single diamine and carbon disulfide are the reactants each recurring unit in the polythiourea molecule will be the same. However, where a mixture of diamines is reacted with carbon disulfide or where a diamine and another compound such as diisothiocyanate are reacted, the polythiourea polymer can contain recurring units that differ from each other within the same molecule depending upon the starting material.

Phenolic-aldehyde polymers usable in making the cured resins of the invention as has been stated hereinabove can be catalyzed by either acids or bases. The acid catalyzed resins are linear thermoplastic polymers, provided extreme conditions are not used with hot concentrated acids, and these linear polymers are called novolacs. The base-catalyzed resins are tridimensional, i.e. cross-linked, with the structures becoming more complex as the reaction proceeds in their manufacture, but the reaction can be interrupted at any desired intermediate stage by cooling the reactants.

Phenol is, of course, the most used of these phenolic components in the phenolic class. The structure of the phenolic exercises a marked influence on the nature of the resin product. It is well known that a hydroxy group on a benzene ring is ortho and para directing. Thus, any entering group on the phenol will be ortho or para to the hydroxy group. Highly cured C-stage resins can be obtained only from phenols having all the ortho and para groups free. Those having only two ortho or para positions open cure but partially or at best very slowly, i.e. such phenols as o- or p-cresol. Those with only one position open produce low molecular weight products, and those with no ortho or para positions open do not react with aldehydes, such as formaldehyde, at all.

Fully cured resins can be obtained from mixtures of phenols which contain a sufficiently large portion of the type 3, i.e. 3 open o- and p-positions. Thus, cresylic acids which have only the 50% m-cresol content yield curable products although it is customary to hold the o-cresol content as low as possible—usually less than 5%. Phenol and cresol and/or xylenol mixture can be used to produce curable resins, or mixture of xylenol and cresol provided the amount of the type 3 phenolic compound is sufficient as described above. Other types of alkylated phenols than cresols and xylenols can also be used. Also, polyhydroxy phenolic compounds can be used.

The following is an illustrative but non-limiting listing of usable phenolic compounds:

| | |
|---|---|
| Phenol | Carvacrol |
| o-Cresol | α-Naphthol |
| m-Cresol | p-Phenylphenol |
| p-Cresol | Catechol |
| 2,4-xylenol | Resorcinol |
| 2,5-xylenol | Hydroquinone |
| 3,4-xylenol | Pyrogallol |
| 3,5-xylenol | Hydroxyhydroquinone |
| Thymol | Phloroglucinol, etc. |

By far the most important aldehyde for phenolic resins is formaldehyde. While many other aldehydes and ketones give resinous products with phenolic compounds the preferred aldehyde is formaldehyde. Two other commercially used aldehydes which give excellent resins are glyoxal and furfural. Many other aldehydes could be used in making the resins of the invention, but the preferred aldehydes have been named.

In making the phenolic-aldehyde polymers for use in making the resins of the invention, normally, it will be preferred to use a molar excess of the aldehyde over the phenol. Commercially ratios of 1.1–1.5 to 1 aldehyde to phenol are used; however, products with good properties are produced in the range of about 1.1–3.5 to 1 ratio of aldehyde to phenol.

Alkaline catalysis of phenolic resins formation is independent of the hydroxide ion concentration, except where the latter is low. At 100°, for example, it has been found that the rate of resinification is practically independent of the amounts of sodium hydroxide present between proportions of about 5 and about 100 mol percent based on the phenol. Acid resinification on the other hand is very sensitive to concentration of catalyst, the rate being a direct function of hydrogen ion concentration.

As is well known in the art, time and temperature of reaction in producing the phenolic-aldehyde polymer must be carefully controlled to obtain the desired product. When the desired stage of polymerization is reached, the reaction mixture is quickly cooled to stop the reaction, and these conditions of time and temperature are well known.

The mixed polythiourea and phenolic-aldehyde polymers can be cured by heating in the absence of added curing agents in the case of mixtures of A- or B-stage base-catalyzed resins since no curing agent is needed to cure this type of phenolic and the free methylol group on the phenolic will cure the linear polythiourea polymer. If a novolac type phenolic is used few if any methylol groups are present and a curing agent such as hexamethylene tetraamine (called hexa) is preferably added to speed the curing reaction. Other polyamines and other curing agents are well known for curing phenolic resins and in any event the invention does not lie in the use of any particular type of curing agent or agents.

As has been indicated above, compounds having free methylol groups are good curing agents for linear polythiourea polymers, and A- and B-stage phenolic resins are suitable. If it is desired to add other reactive methylol group-containing compounds, such compounds as trimethylolmelamine, dimethylolurea, dimethylol-methylene-bis-steramide, and melamine-formaldehyde and urea-formaldehyde resins containing reactive methylol groups, etc. can be used.

A particularly suitable group of cross-linking agents for the linear polythiourea polymers is formaldehyde and formaldehyde-liberating substances. Para-formaldehyde is the most convenient and effective form of formaldehyde used. It is interesting to note that formaldehyde is a preferred reactant to be used in making the phenolic polymers to be blended and co-cured with the polythiourea polymers. Trioxane and other polymeric forms of formaldehyde can also be used. Also formaldehyde under basic conditions will cure a novolac resin.

A miscellaneous group of curing agents also usable for curing the polythiourea polymers are glyoxal, epichlorohydrin, $Pb_3O_4$ meta-toluenediisocyanate, naphthalene diisocyanate, etc.

To make the blended co-cured resins of the invention one or more each of the polythiourea polymers and the phenolic-aldehyde polymers described above are blended together in any desired portion and co-cured. Normally to obtain a really substantially different resin the polymer mixture should contain at least about 5 parts by weight of the component of the mixture present in the smaller amount per 95 parts by weight of the components present in larger amounts, and either the linear polythiourea polymer or the phenolic-aldehyde polymer can be present in the mixture in the smaller amount. At least about 2% of either component in the blend will affect the characteristics of the final cured resin to a measurable degree, however. The components of the mixture can be blended in various ways generally well known depending on the characteristics of the particular materials to be blended. "Baker-Perkins" mixers can be used if these polymers are viscous liquids, and a rolling mill can be used if the polymers are semisolid. The mixtures can be heated to an elevated temperature to melt solid polymer or to increase the fluidity of viscous polymer for improved blending, provided temperatures are not used that would cause substantial decomposition of either or both components of the mixture. Fillers such as carbon black and other fillers can be blended into the mixture in a conventional manner. If it is desired to add supplemental curing agents normally it would be preferred that they be added last in blending the ingredients together; however, the blending of all the ingredients including the added curing agents can be carried out simultaneously, particularly if the added curing agents are not too-fast acting or curing inhibitors are used. If the mixture is particularly fast-curing with added curing agent, it will be preferred to mix the component and added curing agent as fast as possible and at as low a temperature as possible to avoid having the polymer blend set up or cure before it can be removed from the mixing vessel. However, there will be times when it will be desired to have the polymer blend cure quickly in the particular vessel or structure to which it has been poured. Rate of curing can in many cases be slowed down by curing inhibitors. Curing agents can be mixed or blended into the polymer mixture in a similar manner as the polymers are blended or by other conventional means well known in the art.

Depending upon the particular mixture involved, and added curing agent if any, curing is preferably carried out at a temperature in the range of about 75° to about 200° C. It is preferred not to use temperatures above about 250° C. to avoid substantial decomposition of reactants. With very reactive components or added curing agents temperatures as low as 50° C. or even room temperature or lower can be used, if desired.

It should be understood that linear polythiourea polymers and A- or B-stage phenolic-aldehyde polymers will cure without the addition of a curing agent to give excellent cured resins of the invention; however, the novolac type phenolic requires a curing agent. If a curing agent or agents are used less than about 15% by weight based on the mixture of components to be cured will be required and preferably less than about 10%. Where particularly active curing agents are used, 5% or less by weight can be used. If more than one curing agent is used, e.g., a different one for each component of the polymer mixture, the basis for the curing agent will usually be the amount of the respective component to be cured in the polymer blend. If hexa is used to cure a novolac, between about 6 and about 12% is preferably used, and if melamine-formaldehyde condensation product having free methylol groups is used to cure the polythiourea components not more than about 10% will normally be used.

The invention will be more clearly understood from the following detailed description of specific examples thereof:

EXAMPLE 1

This described in detail the preparation of a polythiourea polymer. A tared liter flask fitted with a nitrogen inlet, Trubore stirrer, thermometer, dropping funnel and reflux condenser vented through a mineral oil trap, was purged with nitrogen and charged with 265.8 grams (1.508 moles) of 1,2-bis-(3-aminopropoxy)ethane and 532 ml. of methanol. Exothermic heat of mixing was noted. The mixture was cooled in an ice bath, the nitrogen purging stopped, and with good agitation 120.6 grams (1.584 moles), 5% excess, of carbon disulfide was added gradually via the dropping funnel, as follows:

| Minutes | ° C. | $CS_2$, ml. | Remarks |
| --- | --- | --- | --- |
| 0 | 2 | 0 | Start. |
| 10 | 16.5 | 34 | |
| 15 | 19 | 50 | Clear, faint green. |
| 20 | 18.7 | 64 | Slightly milky. |
| 30 | 17 | 95 | All $CS_2$ in. |
| 31 | 16.5 | | Suddenly, opaque white. |

After cooling to 4° C. during 1 hour, the stirrer was stopped, and the mixture separated into layers. The upper layer (about 33% of the total) was clear, almost colorless and very fluid. The bottom layer was clear, very light yellow and viscous. On stirring and warming to 25° C. the mixture became homogeneous; on recooling to 5° C., phase separation reoccurred. The supernatant layer was decanted and the residue was stored overnight under nitrogen at room temperature. The flask was then fitted with a nitrogen bubbler, placed in an oil bath, and the condenser was changed from reflux to distillation position.

Solvent was then removed by distillation with the stirrer operating. Distillation was essentially complete after 35 minutes, the oil bath temperature going from 98 to 128° C. At this point slow evolution of hydrogen sulfide began and continued at an increasing rate during the next 50 minutes, as the bath temperature was increased to 170° C. After 5 more minutes at 170-174° C. gas evolution essentially stopped, and the viscous, clear, light green polymer was bubbled with nitrogen and stirred and heated during the next 3.5 hours, at a 180-195° C. bath temperature.

After cooling the resin under nitrogen to about 140° C., 0.75 gram of 2-mercaptobenzothiazol (an antioxidant) was stirred in, and the hot viscous mass was dumped into a glass tray, greased with silicone grease. The cooled product was a tacky, clear, very-light-amber semi-solid.

this resin is handled as a 60% solids solution in methyl ethyl ketone. This type of resin is a linear polymer, a typical repeating structure of which would be as follows:

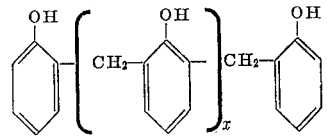

This novolac resin can be reacted with more formaldehyde under alkaline conditions to cause it to cure; however, the preferred curing agent commercially used for novolacs is hexamethylene tetraamine (called hexa) which is normally used in amounts of about 6 to 12% by weight based on the amount of novolac resin solids to be cured.

In Table 1 below the excellent properties of some of the resins of the invention is demonstrated as adhesives for aluminum.

*Table 1*

| No. | Ratio, PTU/PF | Percent HT | Percent MF | Al Prep. | Open Cure | | Closed Cure | | Bond | | | Shear Failure | | | |
|---|---|---|---|---|---|---|---|---|---|---|---|---|---|---|---|
| | | | | | Min. | °C. | Min. | °C. | P.s.i. | Area, In.² | Thick, Mills | Average, p.s.i. | Maximum, p.s.i. | Percent A | Percent C |
| 1 | 0.18 | 6.67 | | a | 5 and 2 | 100 and 150 | 2 and 50 | 170 and 160 | 10 | 1.0 | 3.4 | 630 | 705 | 100 | |
| 2 | 0.18 | 6.67 | | b | 15 | 100 | 5 and 50 | 164 and 160 | 10 | 1.0 | 2.4 | 365 | 540 | 100 | |
| 3 | 0.33 | 6.67 | | a | 5 and 2 | 100 and 150 | 2 and 50 | 170 and 160 | 10 | 1.0 | 2.3 | 615 | 710 | 100 | |
| 4 | 0.33 | 6.67 | | b | 15 | 100 | 5 and 50 | 164 and 160 | 10 | 1.0 | 5.4 | 500 | 580 | 100 | |
| 5 | 0.33 | 10.02 | | a | 5 and 2 | 100 and 150 | 2 and 50 | 170 and 160 | 10 | 1.0 | 1.5 | 710 | 835 | 100 | |
| 6 | 0.33 | 10.02 | | b | 15 | 100 | 5 and 50 | 164 and 160 | 10 | 1.0 | 5.1 | 610 | 905 | 100 | |
| 7 | 0.47 | 6.55 | | a | 5 and 2 | 100 and 150 | 2 and 50 | 170 and 160 | 10 | 1.0 | 1.5 | 760 | 880 | 100 | |
| 8 | 0.47 | 6.55 | | b | 15 | 100 | 5 and 50 | 164 and 160 | 10 | 1.0 | 7.0 | 985 | 1,120 | 100 | |
| 9 | 0.75 | 6.73 | | a | 5 | 90 | 3 and 47 | 160 | 15 | 1.0 | 2.3 | 1,405 | 1,855 | 10 | 90 |
| 10 | 0.75 | 6.73 | 10.2 | a | 5 | 90 | 3 and 47 | 160 | 15 | 1.0 | 2.6 | 1,790 | 2,240 | 60 | 40 |
| 11 | 0.98 | 4.00 | | b | 5 | 110 | 3 and 47 | 160 | 15 | 1.0 | 1.4 | 1,020 | 2,400 | 95 | 5 |
| 12 | 0.98 | 4.00 | | b | 5 | 110 | 3 and 47 | 160 | 15 | 0.5 | 1.0 | 1,675 | 1,110 | 95 | 5 |
| 13 | 0.98 | 8.00 | | b | 5 | 110 | 3 and 47 | 160 | 15 | 1.0 | 1.2 | | 1,730 | 95 | 5 |
| 14 | 0.98 | 8.00 | | b | 5 | 110 | 3 and 47 | 160 | 15 | 0.5 | 1.1 | 1,600 | 1,355 | 95 | 5 |
| 15 | 0.98 | 12.00 | | b | 5 | 110 | 3 and 47 | 160 | 15 | 1.0 | 1.4 | | 1,780 | 100 | |
| 16 | 0.98 | 12.00 | | b | 5 | 110 | 3 and 47 | 160 | 15 | 0.5 | 1.2 | 1,540 | 2,335 | | 100 |
| 17 | 1.00 | 6.73 | 10.0 | a | 3 | 100 | 1 and 49 | 160 | 15 | 1.0 | 2.6 | 2,040 | 2,585 | | 100 |
| 18 | 1.22 | 6.73 | 10.0 | a | 3 | 100 | 1 and 49 | 160 | 15 | 1.0 | 1.6 | 2,135 | 1,240 | 90 | 10 |
| 19 | 1.22 | 6.73 | 30.0 | b | 3 | 100 | 1 and 40 | 160 | 15 | 1.0 | 3.6 | 760 | 620 | 100 | |
| 20 | 1.25 | 6.73 | | b | 10 | 110 | 1 and 49 | 160 | 15 | 1.0 | 1.3 | | 2,010 | | 100 |
| 21 | 1.5 | 6.73 | 10.0 | a | 3 | 100 | 1 and 49 | 160 | 15 | 1.0 | 1.8 | 1,610 | | | |

PTU—Polythiourea polymer of Example 2, 60% concentration in dimethylformamide.
PF—A novolac resin of 60% solids in methyl ethyl ketone similar to the one of Example 4.
PTU/PF—Weight ratio of resin solids.
HT—Hexamethylene tetramine basis the PF resin.
MF—Melamine-formaldehyde resin basis the PTU resin.
a—Etched 2 hrs. at 25° C. in 10 g. of $Na_2Cr_2O_7 \cdot 2H_2O$, 50 g. of 96% $H_2SO_4$ and 340 ml. of water.
b—Etched 10 min. at 70-80° C. in same solution as a.

The specific viscosity of the product at 1% by weight concentration in dimethylformamide at 25° C. was 0.263.

EXAMPLE 2

This is essentially a duplicate experiment of Example 1 using the same reactants except that a much larger batch of polymer was made in this case. The charge of diamine was 6.902 moles and the ratio of $CS_2$ to diamine was 1.03. The product in this case was a light-amber colored semi-solid having a specific viscosity of 0.311 at 1% by weight concentration in dimethylformamide at 25° C.

EXAMPLE 3

This describes the preparation of another linear polythiourea polymer. Although the same diamine was used as was used in Examples 1 and 2 the ratio of carbon disulfide to diamine was appreciably different and a substantially different product resulted. The carbon disulfide/diamine ratio was 0.90, i.e., instead of using an excess of carbon disulfide as in Examples 1 and 2, an excess of diamine was used in this case. The resultant light-amber colored product was a low molecular weight, amine-terminated polythiourea.

EXAMPLE 4

A particularly suitable phenolic-aldehyde polymer for making the resins of the invention is a phenol-formaldehyde novolac resin, i.e. the acid catalyzed type. Suitably this resin is handled as a 60% solids solution in methyl ethyl ketone.

The indicated compositions were made up in 20 ml. screw-cap glass vials and slowly turned end-over-end on a 10 r.p.m. dissolving wheel until the solution was complete. The polythiourea polymer was charged as a 60% solids solution in dimethylformamide and the novolac was charged as a 60% solids solution in methyl ethyl ketone.

The metal strips were prepared from 0.064" thick 24–S.T. aluminum sheet stock cut into 4 by 1 inch strips. These were cleaned by rinsing two times with fresh "triclene" solvent, then etched as described in Table 1. After the etching the strips were thoroughly rinsed with distilled water.

After drying 1 hour at room temperature both surfaces to be bonded were coated with a thin layer of adhesive spread on with a small spatula. Twelve open pairs of strips were then placed on aluminum foil covered "Press-Polish" plates and placed in a 30-ton Elmes Engineering hydraulic press, the platens of which were electrically heated and thermostatically controlled at the "open cure" temperature. The press was then closed until the upper platen was within about ⅛ inch of the adhesive surfaces for the indicated pre-cure time. The strips were then removed and assembled with ½ inch or 1 inch overlap supporting the top strip with a 1 inch shim of like thickness, covered with another sheet of aluminum foil and a "Press-Polish" plate, and returned to the press for the indicated closed cure time. In the "closed cure" processing of the strips pressure was not applied to the platens of the press resting on the strips for the first few minutes indicated in the table to give a small additional amount of in effect "open cure" thereby curing the resins to such an advanced stage that most of it would not be squeezed from between the aluminum plates when pressure was applied. The latter times under "closed cure" and latter temperatures where such temperatures are indicated are the times and temperatures used after the indicated pressure was applied.

Exuded adhesive was removed by scraping with a knife blade. Shear strength was measured in tension on a Tate-Emery 5,000 pound mechanical testing machine at 25° C. with a cross-head speed of 0.20 inch per minute. Approximately 1 inch of the test strip was held by each Templin grip.

Prior to testing the thickness of uncoated and bonded portions of the strips were measured with a micrometer to ±0.0001 inch and the length of the sides of the bond area to ±0.001 inch bond thickness, and areas were calculated from these measurements.

The last two columns of Table 1 indicate the percent failure of the bond by adhesive failure "A" and cohesive failure "C." This was done by examining each tested strip after being broken in shear and estimating the precent failure by adhesion and/or cohesion.

Two curing additives were used in the experiments reported in Table 1. The first of these additives was hexamethylene tetraamine (hexa) added for the purpose of curing the phenolic component of the resin, and the other curing additives MS added particularly to cure the polythiourea component when used was a condensation product of melamine and formaldehyde which was a hygroscopic crystalline powder. Methods of making this type of resin are described in detail in U.S. 2,260,239 when discussing intermediate products produced by stopping condensation at an intermediate stage. These MS resins have free methylol groups which react in the curing process of the resins of the invention.

From the study of the data of Table 1 a preferred mixture of ingredients was estimated for use in making aluminium adhesives having optimum properties. This preferred mixture is as follows: The weight ratio of the polythiourea to the novolac phenolic on the basis of solids would be in the range of 0.95–1.25, the amount of hexa based on the phenolic would be in the range of about 6 to about 12% by weight, and the amount of melamine-formaldehyde curing agent for the polythiourea would be in the range of 0 to about 10% by weight based on the polythiourea polymer.

The co-cured resins of the invention can be used in a great many ways in addition to use as aluminum adhesives, e.g. in the making of molded goods, gaskets, saturation and plying of fabrics, for making film, for spinning into yarn, to make plastics, textiles, coatings, etc.

Although the invention has been described in terms of specified embodiments which are set forth in considerable detail, it should be understood that this is by illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A resin composition comprising a mixture of a linear polythiourea polymer having recurring units of the formula

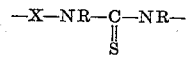

where R is selected from the class consisting of hydrogen and monovalent hydrocarbon radicals, and X consists of a chain having terminal carbon atoms and other atoms selected from the class consisting of carbon and oxygen, nitrogen and sulfur hetero-atoms with each hetero-atom being separated from other hetero-atoms by at least one carbon atom, and a phenolic-aldehyde polymer selected from the class consisting of novolac, resole and resitole polymers, co-cured to a cross-linked resin.

2. The composition of claim 1, wherein the weight ratio of said polythiourea polymer to said phenolic-aldehyde polymer is in the range of from about 5:95 to about 95:5.

3. The composition of claim 1, wherein said phenolic-aldehyde polymer is a phenol-formaldehyde polymer.

4. The composition of claim 1, wherein R is hydrogen, X consists of a chain of at least 7 atoms, said phenolic-aldehyde polymer is a ketone-soluble novolac phenol-formaldehyde polymer, and said mixture has from about 0.95 to about 1.25 parts by weight of said polythiourea polymer per part of said phenol-formaldehyde polymer.

5. The composition of claim 4, wherein said polythiourea polymer has recurring units of the formula

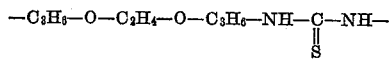

the curing agent for said phenol-formaldehyde polymer is from about 6% to about 12% by weight based on said phenol-formaldehyde polymer of hexamethylene tetraamine.

6. The composition of claim 5, wherein the curing agent for said polythiourea is not more than about 10% of a melamine-formaldehyde condensation product having free methylol groups.

References Cited in the file of this patent

UNITED STATES PATENTS

| | | |
|---|---|---|
| 2,356,764 | Kern | Aug. 29, 1944 |
| 2,782,089 | Rakowski et al. | Feb. 19, 1957 |
| 2,816,879 | Wittbecker | Dec. 17, 1957 |
| 2,884,401 | Wesp | Apr. 28, 1959 |